United States Patent
Chang et al.

(10) Patent No.: US 9,345,290 B2
(45) Date of Patent: May 24, 2016

(54) BRACELET AND ELECTRONIC DEVICE USING THE SAME

(71) Applicant: Chiun Mai Communication Systems, Inc., New Taipei (TW)

(72) Inventors: Ming-Shiung Chang, New Taipei (TW); Chia-Hsin Chang, New Taipei (TW); Pao-Ching Mao, New Taipei (TW); Shih-Kuo Tsai, New Taipei (TW); Hsin-Wei Wang, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 99 days.

(21) Appl. No.: 14/221,551

(22) Filed: Mar. 21, 2014

(65) Prior Publication Data

US 2014/0298858 A1    Oct. 9, 2014

(30) Foreign Application Priority Data

Apr. 9, 2013    (TW) .............................. 102112546 A

(51) Int. Cl.
*A44C 5/20* (2006.01)
*A44C 5/00* (2006.01)
*H04B 1/3827* (2015.01)
*H04B 1/3888* (2015.01)

(52) U.S. Cl.
CPC ............. *A44C 5/0007* (2013.01); *A44C 5/2066* (2013.01); *A44C 5/2076* (2013.01); *H04B 1/385* (2013.01); *H04B 1/3888* (2013.01); *A44C 5/0084* (2013.01); *H04B 2001/3861* (2013.01)

(58) Field of Classification Search
None
See application file for complete search history.

(56) References Cited

U.S. PATENT DOCUMENTS

| | | | | | |
|---|---|---|---|---|---|
| 2,904,347 | A * | 9/1959 | Tucker | ................ | A44B 11/2526 24/116 R |
| 2,933,795 | A * | 4/1960 | Meeker | ............... | A44B 11/2526 24/180 |
| 3,212,152 | A * | 10/1965 | Tanaka | ................ | A44B 11/2526 24/311 |
| 3,611,513 | A * | 10/1971 | Hoober | ................ | A44C 5/2052 24/658 |
| 4,458,392 | A * | 7/1984 | Pogharian | ............ | A44C 5/2076 24/664 |
| 4,651,390 | A * | 3/1987 | Skobel | ................. | A44C 5/2052 24/625 |
| 4,879,883 | A * | 11/1989 | Bruner | ................. | A44C 5/2076 267/158 |
| 4,924,562 | A * | 5/1990 | Pogharian | ............ | A44C 5/2052 24/647 |
| 5,832,573 | A * | 11/1998 | Howell | .............. | A44B 11/2526 24/616 |
| 6,145,171 | A * | 11/2000 | Hoshino | .............. | A44C 5/2052 24/587.1 |
| 6,484,376 | B1 * | 11/2002 | Khatchadourian | .. | A44C 5/2052 24/116 A |
| 6,637,083 | B1 * | 10/2003 | Howell | ................ | A44B 11/263 24/614 |
| 6,678,925 | B1 * | 1/2004 | Howell | .............. | A44B 11/2592 24/647 |
| 7,155,786 | B2 * | 1/2007 | Grimm | .............. | A44B 11/2592 24/647 |
| 2005/0183249 | A1 * | 8/2005 | Ninomiya | ............ | A44C 5/2052 24/658 |
| 2005/0188512 | A1 * | 9/2005 | Ninomiya | ............ | A44C 5/2052 24/587.11 |

FOREIGN PATENT DOCUMENTS

CN           202230670         5/2012

* cited by examiner

*Primary Examiner* — Jack W Lavinder
(74) *Attorney, Agent, or Firm* — Novak Druce Connolly Bove + Quigg LLP

(57) ABSTRACT

A bracelet includes a first wristband portion having a first connecting end and a first lock end opposite to the first connecting end, a second wristband portion having a second connecting end and a second lock end opposite to the second connecting end, and a lock mechanism. The seconded connecting end is rotatably connected to the first connecting end. The first lock end is connected to the second lock end, thereby locking the first wristband portion and the second wristband portion together to surrounding a receiving space for receiving a user's wrist.

14 Claims, 7 Drawing Sheets

BRACELET AND ELECTRONIC DEVICE USING THE SAME

BACKGROUND

1. Technical Field

The disclosure generally relates to bracelets having a lock mechanism and electronic devices using the bracelets.

2. Description of Related Art

Bracelets incorporating electric devices such as media players, mobile phones, pedometers, and health detecting devices are well known. Most bracelets have lock mechanisms for locking the bracelets around users' wrists. However, the lock mechanisms are often hard to release and tend to loosen after a long use. Furthermore, when users wear the bracelets, the lock mechanisms usually are located at a position corresponding to a middle portion of a user's wrist, which easily creates pressure to the wrist.

Therefore, there is room for improvement within the art.

BRIEF DESCRIPTION OF THE DRAWINGS

Many aspects of the disclosure can be better understood with reference to the drawings. The components in the drawings are not necessarily drawn to scale, the emphasis instead being placed upon clearly illustrating the principles of the disclosure. Moreover, in the drawings, like reference numerals designate corresponding parts throughout the views.

DETAILED DESCRIPTION

Figure 1:
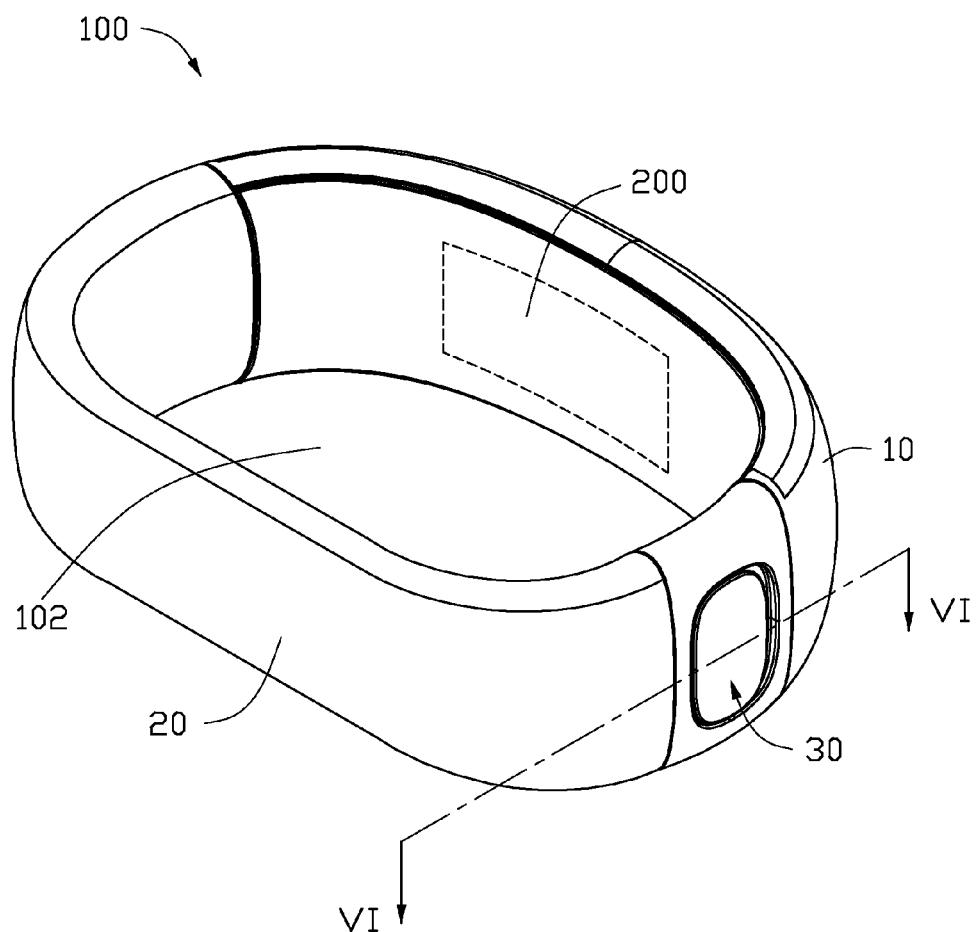
FIG. 1 is a schematic view of a bracelet and an electronic device using the bracelet, according to an exemplary embodiment of the disclosure.
Figure 7:
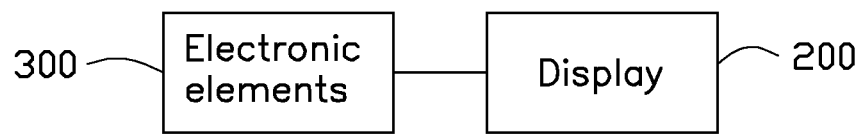
FIG. 7 is a schematic view of electronic elements and a display of the electronic device of FIG. 1, according to an exemplary embodiment of the disclosure.

FIG. 1 shows a bracelet 100 and an electronic device (not labeled) using the bracelet 100, according to an exemplary embodiment of the disclosure. The electronic device further includes a plurality of electronic elements 300 (schematically shown in FIG. 7) incorporated into the bracelet 100, configured to support various functions of the electronic device, and a display 200 positioned on the bracelet 100 and electronically connected to the electronic elements 300, to display information of the electronic device. In one embodiment, the plurality of electronic elements 300 at least includes a processor received in the bracelet 100 and electrically connected to the display 200.

The bracelet 100 includes a first wristband portion 10, a second wristband portion 20 connected to the first wristband portion 10, and a lock mechanism 30. The first wristband portion 10, second wristband portion 20, and the lock mechanism 30 are capable of connecting with each other, thereby surrounding a receiving space 102 for receiving a user's wrist.

Figure 2:
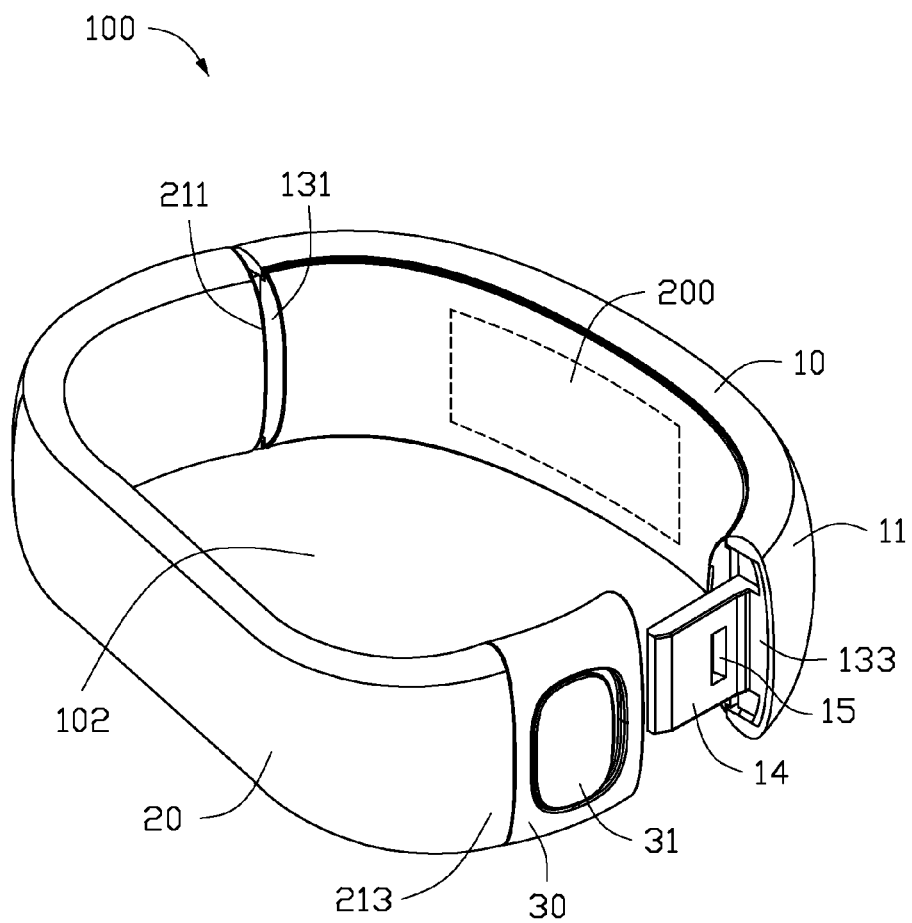
FIG. 2 is similar to FIG. 1, but showing a lock mechanism of the bracelet in a released status.

Referring to FIG. 2, the first wristband portion 10 can be a substantially half-elliptic band including a first outer surface 11 opposite to the receiving space 102, a first connecting end 131, and a first lock end 133 opposite to the first connecting end 131. The electronic elements 300 are received in the first wristband portion 10. The display 200 is positioned on the first outer surface 11. For convenient assembly of the electronic elements 300 into the first wristband portion 10, the first wristband portion 10 can be formed by two covers latched together, with an accommodating space therein to receive the electronic elements 300. The first wristband portion 10 can be made of plastic, rubber, or metal. A locking member 14 protrudes from the first lock end 133. The locking member 14 is a substantially rectangular board and defines a latching hole 15. The latching hole 15 is a through hole.

Figure 4:
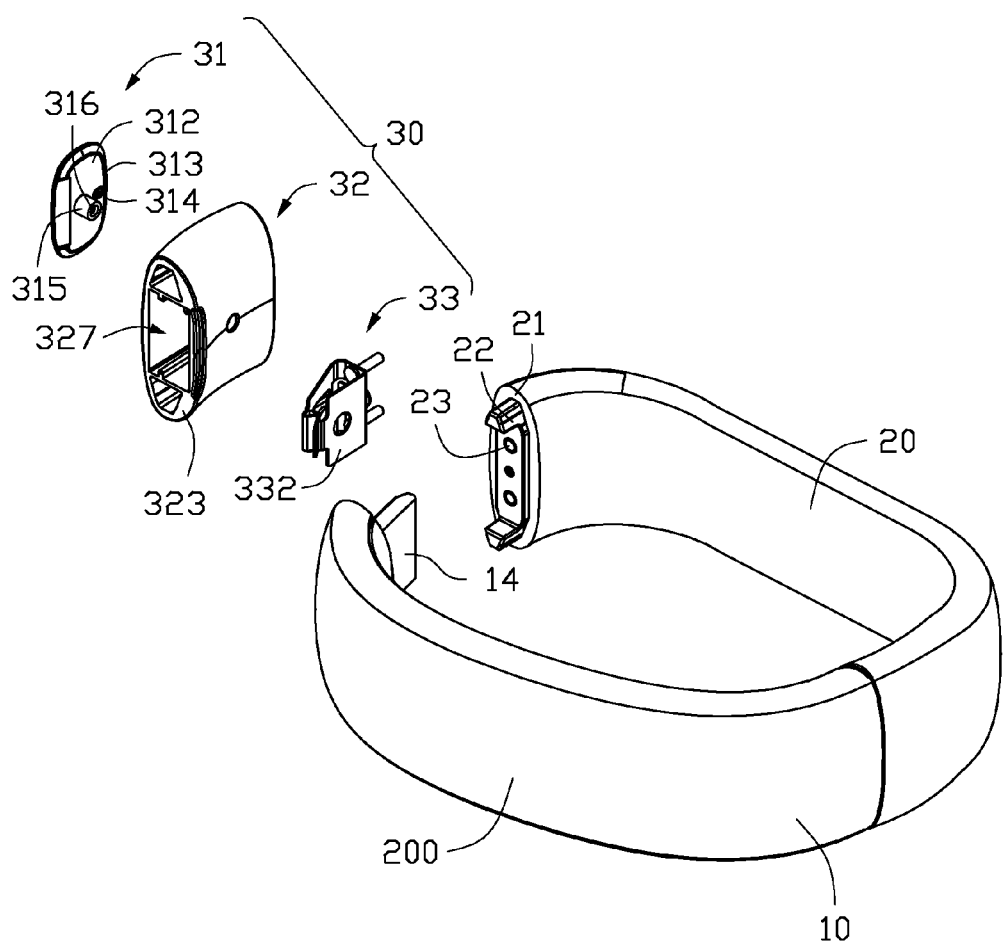
FIG. 4 is similar to FIG. 3, but showing the bracelet from another aspect.

Referring to FIGS. 2 and 4, the second wristband portion 20 can be a substantially wave-shaped band and includes a second connecting end 211 and a second lock end 213 opposite to the second connecting end 211. Two fixing blocks 22 protrude from the second lock end 213 and are spaced from each other. Two fixing holes 23 are defined in the second lock end 213 and are located between the two fixing blocks 22. The second connecting end 211 can be hinged to the first connecting end 131 which may have a hinge or a helical torsion spring.

Figure 3:
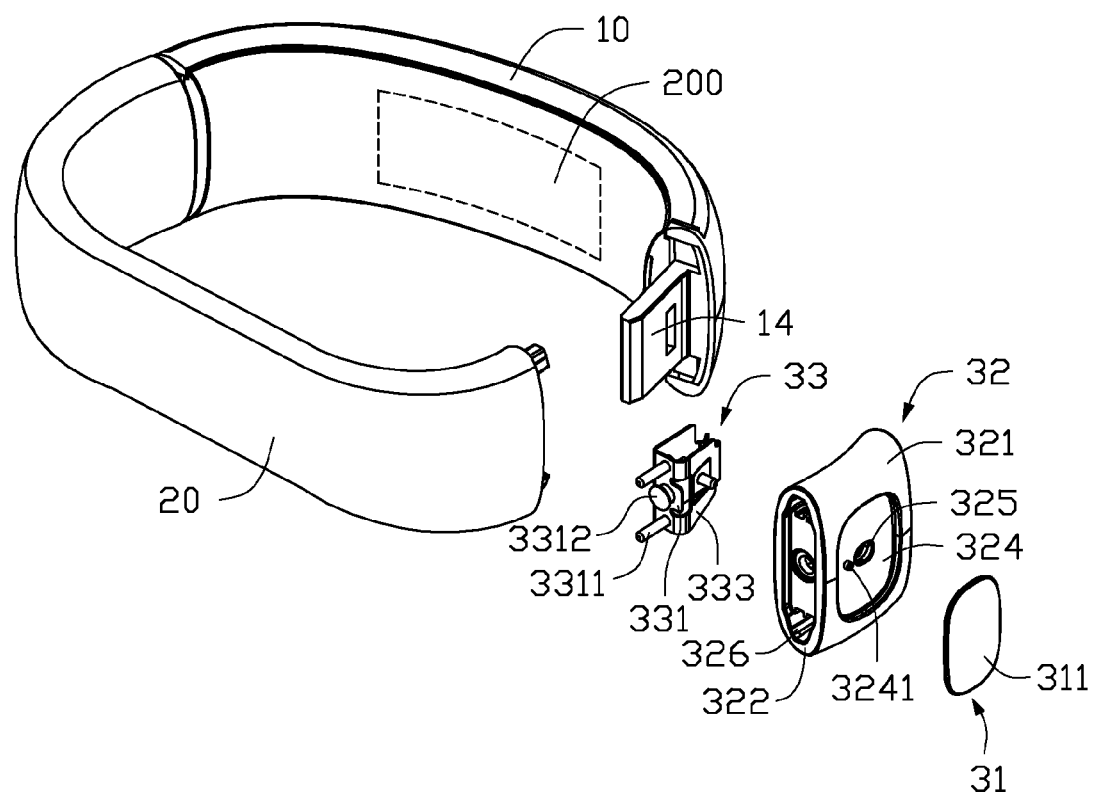
FIG. 3 is a partially exploded, isometric view of the bracelet of FIG. 2.

Referring to FIGS. 3 and 4, the lock mechanism 30 has a button 31, a main body 32, and an elastic member 33.

Figure 6:
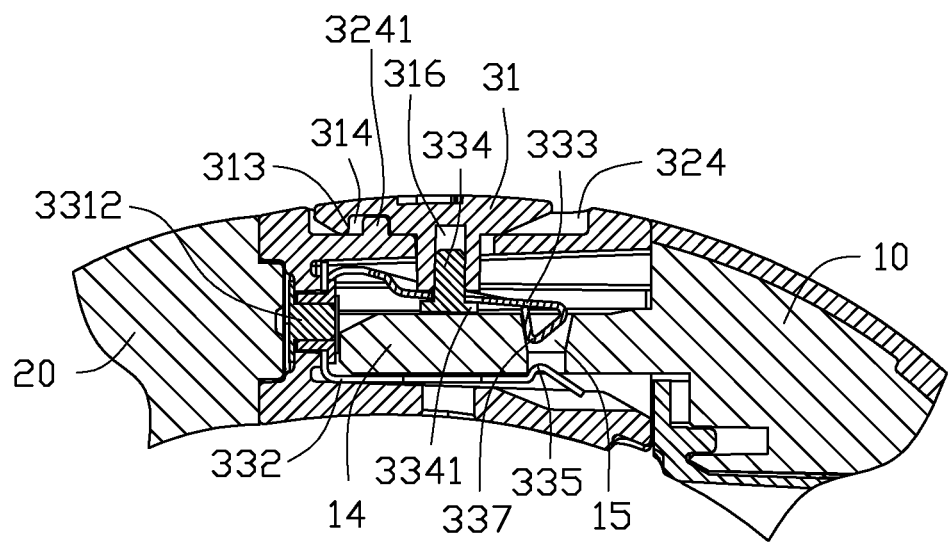
FIG. 6 is a cross-sectional view of FIG. 1 taken along line VI-VI.

The button 31 has an operating surface 311 and an interior surface 312 opposite to the operating surface 311. A hook portion 313 (best shown in FIG. 6) protrudes from an edge portion of the interior surface 312 and extends towards the interior surface 312. A recessed portion 314 (see FIG. 6) is formed by the interior surface 312 and the hook portion 313. A post 315 protrudes from the interior surface 312 and spaced from the recessed portion 314. The post 315 longitudinally defines a hole 316 through a free end away from the interior surface 312.

The main body 32 is a substantially hollow block. The main body 32 includes a mounting surface 321, a fastening end 322, and a third connecting end 323 opposite to the fastening end 322. When the bracelet 100 is assembled, the fastening end 322 is connected to the second lock end 213 and the third connecting end 323 is connected to the first lock end 133. The mounting surface 321 defines a mounting recess 324 and a sliding hole 325. A limiting protrusion 3241 protrudes from a bottom 3243 of the mounting recess 324, corresponding to the recessed portion 314. The sliding hole 325 is defined in the bottom 3243. The button 31 is slidably mounted in the mounting recess 324 with the post 315 inserted through the sliding hole 325 and the limiting protrusion 3241 resisting the recessed portion 314. The fastening end 322 defines two latching holes 326 corresponding to the two fixing blocks 22. The third connecting end 323 defines an opening 327. The locking member 14 of the first wristband portion 10 is inserted into the opening 327.

Figure 5:
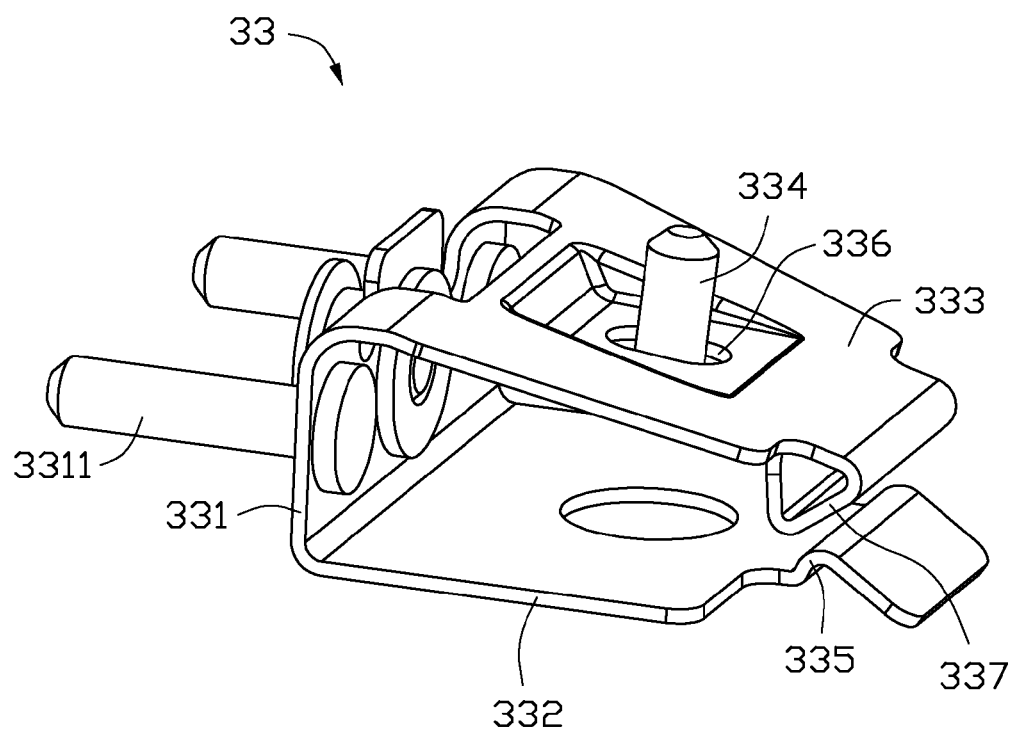
FIG. 5 is an enlarged view of an elastic member of FIG. 3.

Referring to FIG. 3 through FIG. 5, the elastic member 33 is a substantially U-shaped metal sheet. The elastic member 33 includes a main portion 331, an extending arm 332, an elastic arm 333, and a guiding post 334. Two fastening members 3311, such as screw bolts, and a fastening pin 3312 are attached to the main portion 331. The fastening members 3311 are mounted into the fixing holes 23, thereby fastening the elastic member 33 to the second wristband portion 20. The fastening pin 3312 can be located between the two fastening members 3311. The extending arm 332 and the elastic arm 333 extend from two opposite ends of the main portion 331 and are located at the same side of the main portion 331. The distance between the extending arm 332 and the elastic arm 333 decreases from ends of the extending arm 332 and the elastic arm 333 near the main portion 331 to ends of the extending arm 332 and the elastic arm 333 away from the main portions 331. A free end of the extending arm 332 forms a substantially arcuate protrusion 335 protruding towards the elastic arm 333. The elastic arm 333 defines a guiding hole 336 in a substantially middle portion. The guiding post 334 is inserted through the guiding hole 336. The guiding post 334 has a limiting end 3341 located between the extending arm 332 and the elastic arm 333. The limiting end 3341 has a diameter larger than a diameter of the guiding hole 336, preventing the limiting end 3341 from sliding through the guiding hole 336. A free end of the elastic arm 333 bends towards the arcuate protrusion 335 to form a clasp 337 which has a substantially triangular cross section. The elastic arm 333 and the extending arm 332 are capable of being elastically open or closed relative to each other, thereby enabling the clasp 337 to be close to or away from the arcute protrusion 335.

To assemble the bracelet 100, the guiding post 334 is inserted through the guiding hole 336 with the limiting end 3341 located between the extending arm 332 and the elastic arm 333. The elastic member 33 is mounted into the main body 32 from the opening 327. The main portion 331 is secured to the fastening end 322 of the elastic member 33 through the fastening pin 3312. The fastening members 3311 extend through the fastening end 322. The post 315 of the button 31 is inserted through the mounting recess 324, and the guiding post 334 is threadedly secured into the hole 316 of the post 315, with the limiting end 3341 abutting against a surface of the elastic arm 333 facing the extending arm 332. As such, the button 31 is slidably mounted in the mounting recess 324 of the main body 32. The two fixing blocks 22 are inserted into the two latching holes 326 and the two fastening members 3311 are mounted into the fixing holes 23, thereby securing the lock mechanism 30 to the second wristband portion 20.

To wear the bracelet 100 on the user's wrist, the first lock end 133 having the locking member 14 and the second lock end 213 having the lock mechanism 30 are open relative to each other by rotating the first and second wristband portions 10, 20 about the first connecting end 131 and the second connecting end 211. Then, the bracelet 100 is coiled around the user's wrist. The locking member 14 is inserted into the opening 327 to resist and urge the clasp 337 and the arcuate protrusion 335 away from each other until the locking member 14 extends between the clasp 337 and the arcuate protrusion 335 and the clasp 337 and the arcuate protrusion 335 are latched in the latching hole 15 from two sides of the locking member 14. As such, the lock mechanism 30 locks the first and second wristband portions 10, 20 together.

To unlock the first and second wristband portions 10, 20, the operating surface 311 is pushed, enabling the button 31 to slide in the mounting recess 324. At the same time, the button 31 forces the guiding post 334 to slide until the hook portion 313 resists the limiting protrusion 3241. The button 31 is hooked or scratched out from the mounting recess 324 from a side opposite to the side having the hook portion 313, thereby driving the guiding post 334 to move towards the mounting recess 324. As such, the limiting end 3341 resists the elastic arm 333 at a peripheral portion of the guiding hole 336 and forces the elastic arm 333 to move away from the extending arm 332, causing the clasp 337 to run off the latching hole 15. At this time, the locking member 14 can be drawn out of the lock mechanism 30.

The latching hole 15 can be defined in the first lock end 133 as long as the first lock end 133 can be inserted into the opening 327.

It is understood that the hook portion 313 and the limiting protrusion 3241 can be omitted. In this case, the button 31 can be rotatably secured in the mounting recess 324 through a shaft.

It is to be understood, however, that even through numerous characteristics and advantages of the present disclosure have been set forth in the foregoing description, together with details of assembly and function, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. A bracelet, comprising:
    a first wristband portion having a first connecting end and a first lock end opposite to the first connecting end, the first lock end defining a latching hole;
    a second wristband portion having a second connecting end and a second lock end opposite to the second connecting end, the second connecting end rotatably connected to the first connecting end; and
    a lock mechanism comprising:
        a button;
        a main body defining an opening; and
        an elastic member comprising a guiding post and an elastic arm, a free end of the elastic arm forming a clasp, the main body being secured to the second lock end, the elastic member mounted inside the main body, the guiding post extending through the elastic arm and the main body to be connected to the button, the first lock end being inserted into the main body through the opening, enabling the clasp to be latched in the latching hole, the guiding post configured to drive the elastic arm to move by drawing the button, thereby forcing the clasp to be released from the latching hole.

2. The bracelet as claimed in claim 1, wherein the elastic member further comprises a main portion and an extending arm; the extending arm and the elastic arm extend from two opposite ends of the main portion and are located at the same side of the main portion; the distance between the extending arm and the elastic arm decreases from ends of the extending arm and the elastic arm near the main portion to ends of the extending arm and the elastic arm away from the main portions; a free end of the extending arm forms a substantially arcuate protrusion protruding towards the elastic arm.

3. The bracelet as claimed in claim 2, wherein the extending arm and the elastic arm are capable of elastically opening or closing relative to each other.

4. The bracelet as claimed in claim 2, wherein the elastic arm defines a guiding hole, the guiding post has a limiting end located between the extending arm and the elastic arm; the button has a post; the main body defines a mounting recess; a sliding hole is defined in a bottom of the mounting recess; the button is received in the mounting recess with the post inserted through the sliding hole; the guiding post is inserted through the guiding hole to be secured to the post; the limiting end abuts against the elastic arm at an peripheral portion of the guiding hole.

5. The bracelet as claimed in claim 4, wherein the main body further comprises a mounting surface; the mounting recess is defined in the mounting surface; the bottom of the mounting recess further has a limiting protrusion; the button comprises an interior surface facing the main body, the interior surface has a hook portion, the hook portion is capable of latching with the limiting protrusion.

6. The bracelet as claimed in claim 2, wherein the main body comprises a fastening end opposite to the opening; the main portion has two fastening members and a fastening pin attached thereto; the two fastening members extend through the fastening end and are secured to the second lock end.

7. The bracelet as claimed in claim 1, wherein a locking member protrudes from the first lock end, the latching hole is defined in the locking member; the locking member is inserted into the main body through the opening.

8. An electronic device, comprising:
processor;
a display electronically connected to the processor; and
a bracelet comprising:
    a first wristband portion having a first connecting end and a first lock end opposite to the first connecting end, the first lock end defining a latching hole, the processor received in the first wristband, the display positioned on the first wristband portion;
    a second wristband portion having a second connecting end and a second lock end opposite to the second connecting end, the second connecting end rotatably connected to the first connecting end; and
    a lock mechanism comprising:
        a button;
        a main body defining an opening; and
        an elastic member comprising a guiding post and an elastic arm, a free end of the elastic arm forming a clasp, the main body being secured to the second lock end, the elastic member mounted inside the main body, the guiding post extending through the elastic arm and the main body to be connected to the button, the first lock end being inserted into the main body through the opening, enabling the clasp to be latched in the latching hole, the guiding post configured to drive the elastic arm to move by drawing the button, thereby forcing the clasp to be released from the latching hole.

9. The bracelet as claimed in claim 8, wherein the elastic member further comprise a main portion and an extending arm; the extending arm and the elastic arm extend from two opposite ends of the main portion and are located at the same side of the main portion; the distance between the extending arm and the elastic arm decreases from ends of the extending arm and the elastic arm near the main portion to ends of the extending arm and the elastic arm away from the main portions; a free end of the extending arm forms a substantially arcuate protrusion protruding towards the elastic arm.

10. The bracelet as claimed in claim 9, wherein the extending arm and the elastic arm are capable of elastically opening or closing relative to each other.

11. The bracelet as claimed in claim 9, wherein the elastic arm defines a guiding hole, the guiding post has a limiting end located between the extending arm and the elastic arm; the button has a post; the main body defines a mounting recess; a sliding hole is defined in a bottom of the mounting recess; the button is received in the mounting recess with the post inserted through the sliding hole; the guiding post is inserted through the guiding hole to be secured to the post; the limiting end abuts against the elastic arm at an peripheral portion of the guiding hole.

12. The bracelet as claimed in claim 11, wherein the main body further comprises n mounting surface; the mounting recess is defined in the mounting surface; the bottom of the mounting recess further has a limiting protrusion; the button comprises an interior surface facing the main body, the interior surface has a hook portion, the hook portion is capable of latching with the limiting protrusion.

13. The bracelet as claimed in claim 9, wherein the main body comprises a fastening end opposite to the opening; the main portion has two fastening members and a fastening pin attached thereto; the two fastening members extend through the fastening end and are secured to the second lock end.

14. The bracelet as claimed in claim 8, wherein a locking member protrudes from the first lock end, the latching hole is defined in the locking member; the locking member is inserted into the main body through the opening.

* * * * *